Patented July 8, 1952

2,602,748

UNITED STATES PATENT OFFICE 2,602,748

SHORTENING COMPOSITION FOR AND METHOD OF BAKING YEAST-RAISED BAKED GOODS

Francis Frederick Hansen, Pittsburgh, Pa.

No Drawing. Application June 12, 1945, Serial No. 599,119

6 Claims. (Cl. 99—91)

In accordance with the present invention, there are provided certain improvements in the art of baking food products, such as bread and the like, wherein yeast is used for leavening the dough to be baked, the invention producing a bread of superior texture, having an improved and whiter crumb than the usual breads baked from the accepted standard formulae, and which is further characterized by thinner walls in the glucose cells, a finer grain, and which remains fresh longer than such standard breads.

The invention further comprises an improved yeast food which has a synergistic effect on usual chemical compounds employed as yeast foods, such as potassium bromate, calcium sulphate, ammonium chloride and sodium chloride. Such yeast foods have the property of increasing the amount of yeast in a given dough mix, and the present invention provides an improved synergist for such yeast foods to cause a very rapid prolification of the yeast in the dough.

More specifically, the present invention comprises the incorporation of a material which is best identifiable by the designation "calcium lacto-phosphate" in the flour from which bread dough is to be made. This calcium lactophosphate is not a definite compound, but is actually a mixture of mono-calcium acid phosphate and the reaction product of the neutralization of lactic acid with neutralizing calcium compounds such as calcium carbonate or calcium hydroxide. The neutralization product comprises substantially equal molecular parts of normal calcium lactate and calcium acid lactate, the latter being unstable in the absence of calcium lactate; and to the reaction mixture there are added from three to five per cent of mono-calcium acid phosphate.

In the present process the calcium acid lactate is not separated from its mixture with calcium lactate, and the calcium acid lactate is the active ingredient. But normal fermentation of yeast in the dough forms lactic acid, which is beneficial and improves the quality and viscosity of the dough; and while the calcium acid lactate is the active agent in the present invention the introduction of mono-calcium acid phosphate to form the calcium lactophosphate referred to above acts as a buffer in retarding the conversion of the lactic acid generated by the fermentation of the yeast into neutral salts.

The material designated herein as calcium lactophosphate is fluffy in character and has a high bulk factor. These properties make the calcium lactophosphate desirable as a conditioner for particles of hard fat used as shortening for the bread. This fat is frozen and pulverized in a hammer mill or the like, producing coarse and fine particles which are separated by air classification, the calcium lactophosphate being injected during the classifying before the fine fat particles settle, so that such fine particles are coated by the calcium lactophosphate. The fine fat particles may be, and preferably are, of the order of 200 mesh and finer. Such coating prevents the fat particles from agglomerating and, being water-soluble, the calcium lactophosphate assists the distribution of the fat through the dough. This property is a distinguishing property in favor of calcium lactophosphate over other materials, such as calcium stearate, which have been used for similar purposes, but calcium stearate has no beneficial effects on the dough, and it repels water.

In carrying out the improvements of the present invention, the amount of calcium lactophosphate is between $\frac{1}{8}$ and $\frac{1}{4}$ of one percent of total weight of the flour, the optimum amount being three ounces of calcium lactophosphate for each 100 pounds of flour. The calcium lactophosphate may be used in baking any product in which yeast is used, and it acts as a synergist for the usual commercial yeast foods now employed by bakers, and which are of the types of compounds noted above. Calcium lactophosphate produces equally beneficial results with either hard or soft water, produces better texture to the bread, finer grain, thinner walls in glucose cells, whiter crumb, finer and closer texture, and the bread remains fresh longer.

Where the reaction mixture of calcium lactate and calcium acid lactate is employed in the absence of mono-calcium acid phosphate, the reaction mixture is used in similar quantities to those indicated above for calcium lactophosphate. While normal calcium lactate has been used in yeast foods, it is no more effective and is more expensive than calcium sulphate. The present invention includes the discovery that calcium acid lactate noticeably improves the action of yeast foods.

The term "calcium lactophosphate" as used in this description and the appended claims refers to the mixture of the reaction product of equimolar quantities of calcium lactate and calcium acid lactate together with approximately three percent to five percent of mono-calcium acid phosphate, the said reaction product of calcium lactate and calcium acid lactate having been obtained by neutralizing lactic acid with calcium hydroxide and calcium carbonate.

The term "bread" as used in the following claims is intended to cover any baked food product made with yeast.

I claim:

1. In the baking of yeast-raised baked goods, the steps which comprise preparing the bread mix and incorporating therein the reaction product resulting from the neutralizing to a controlled degree of lactic acid with a calcium compound selected from the group consisting of calcium hydroxide and calcium carbonate in amounts to produce essentially equimolar proportions of calcium lactate and calcium acid lactate.

2. The method defined in claim 1 of baking yeast-raised baked goods wherein there has been added to such reaction product from approximately 3% to approximately 5% of mono-calcium acid phosphate.

3. The method of baking yeast-raised baked goods defined in claim 1 wherein the calcium acid lactate is present in the bread mix in the amount of approximately one-eighth to one-fourth of 1% by weight of flour.

4. The method of making yeast-raised baked goods as defined in claim 1 wherein the reaction product is incorporated into the mix along with and as a coating for finely divided hard fat particles.

5. A shortening material for use in making yeast-raised baked goods comprising finely divided hard fat particles coated with a reaction product resulting from neutralizing to a controlled degree of lactic acid with a calcium compound selected from the group consisting of calcium hydroxide and calcium carbonate in amounts to produce essentially equimolar proportions of calcium lactate and calcium acid lactate.

6. The shortening material defined in claim 5 wherein such reaction product has added thereto from approximately 3 to approximately 5% of mono-calcium acid phosphate, the reaction product then being calcium lactophosphate.

FRANCIS FREDERICK HANSEN.

REFERENCES CITED

The following references are of record in the file of this patent:

UNITED STATES PATENTS

| Number | Name | Date |
|---|---|---|
| 1,101,015 | Estabrook et al. | June 23, 1914 |
| 1,190,827 | Wahl | July 11, 1916 |
| 1,210,940 | Holbrook | Jan. 2, 1917 |
| 1,231,114 | Atkinson | June 26, 1917 |
| 1,264,592 | Atkinson | Apr. 30, 1918 |
| 1,322,561 | Grelck | Nov. 25, 1919 |
| 1,427,979 | Stokes | Sept. 5, 1922 |
| 1,431,938 | Dunham | Oct. 17, 1922 |
| 1,500,545 | Buffington | July 8, 1924 |
| 1,559,330 | Lowy | Oct. 27, 1925 |
| 1,589,311 | Hewitt | June 15, 1926 |
| 1,887,175 | Woxvold | Nov. 8, 1932 |
| 1,911,222 | Bollens | May 30, 1933 |
| 1,928,781 | Chapin | Oct. 3, 1933 |
| 2,401,259 | Lloyd | May 28, 1946 |